US009873172B2

(12) United States Patent
Rahman et al.

(10) Patent No.: US 9,873,172 B2
(45) Date of Patent: Jan. 23, 2018

(54) PALLET CHECKER

(71) Applicant: Cannon Equipment LLC, Cannon Falls, MN (US)

(72) Inventors: Steven Allen Rahman, Farmington, MN (US); Scott Opsahl, Lakeville, MN (US); Mark Rosa, Inver Grove Heights, MN (US)

(73) Assignee: Cannon Equipment LLC, Cannon Falls, MN (US)

( * ) Notice: Subject to any disclaimer, the term of this patent is extended or adjusted under 35 U.S.C. 154(b) by 376 days.

(21) Appl. No.: 14/695,581

(22) Filed: Apr. 24, 2015

(65) Prior Publication Data

US 2015/0306714 A1 Oct. 29, 2015

Related U.S. Application Data

(60) Provisional application No. 61/985,239, filed on Apr. 28, 2014.

(51) Int. Cl.
*G01M 99/00* (2011.01)
*B23P 19/04* (2006.01)

(52) U.S. Cl.
CPC ........... *B23P 19/041* (2013.01); *G01M 99/00* (2013.01)

(58) Field of Classification Search
CPC .................................................... G01M 99/00
See application file for complete search history.

(56) References Cited

U.S. PATENT DOCUMENTS

| 4,743,154 A | * | 5/1988 | James | B23P 19/041 |
| | | | | 198/412 |
| 5,630,695 A | | 5/1997 | McDonnell | |
| 6,892,592 B2 | | 5/2005 | Gatteschi | |
| 7,340,971 B2 | | 5/2008 | Carter et al. | |
| 7,765,668 B2 | | 8/2010 | Townsend et al. | |
| 7,958,624 B2 | | 6/2011 | Townsend et al. | |
| 2006/0174719 A1 | * | 8/2006 | Carter | G01M 5/0033 |
| | | | | 73/865.9 |
| 2008/0093554 A1 | * | 4/2008 | Hoffman | B65G 59/08 |
| | | | | 250/339.01 |

FOREIGN PATENT DOCUMENTS

DE 2410775 * 9/1975
GB 2056681 A 3/1981

* cited by examiner

*Primary Examiner* — Robert R Raevis
(74) *Attorney, Agent, or Firm* — Andrus Intellectual Property Law, LLP

(57) ABSTRACT

An automated pallet checker system for checking the structural integrity of a pallet includes a conveyor arrangement mounted on a framework and operable to convey the pallet to be checked through an in-feed station and a lift station connected to the in-feed station. The in-feed station is configured to check the pallet for a presence or absence of pallet bottom cross boards as the pallet is carried on the conveyor arrangement. The lift station is also configured to check for obstructions depending from the pallet bottom cross boards, and missing material in leading and trailing edges of the pallet top cross boards during a lifting movement of the pallet in the lift station. A controller is operatively connected to the conveyor arrangement, the in-feed station and the lift station, and is responsive to signals generated in the in-feed station and the lift station to determine whether the pallet being checked in the in-feed station and the lift station is acceptable or unacceptable.

27 Claims, 13 Drawing Sheets

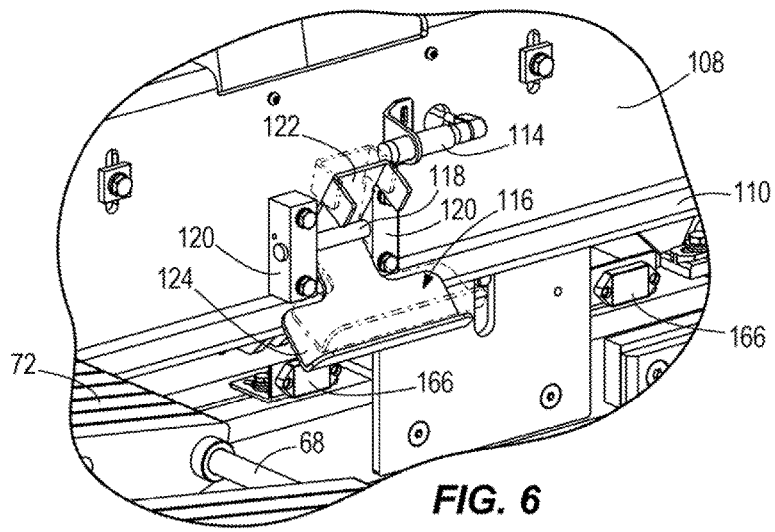
FIG. 6
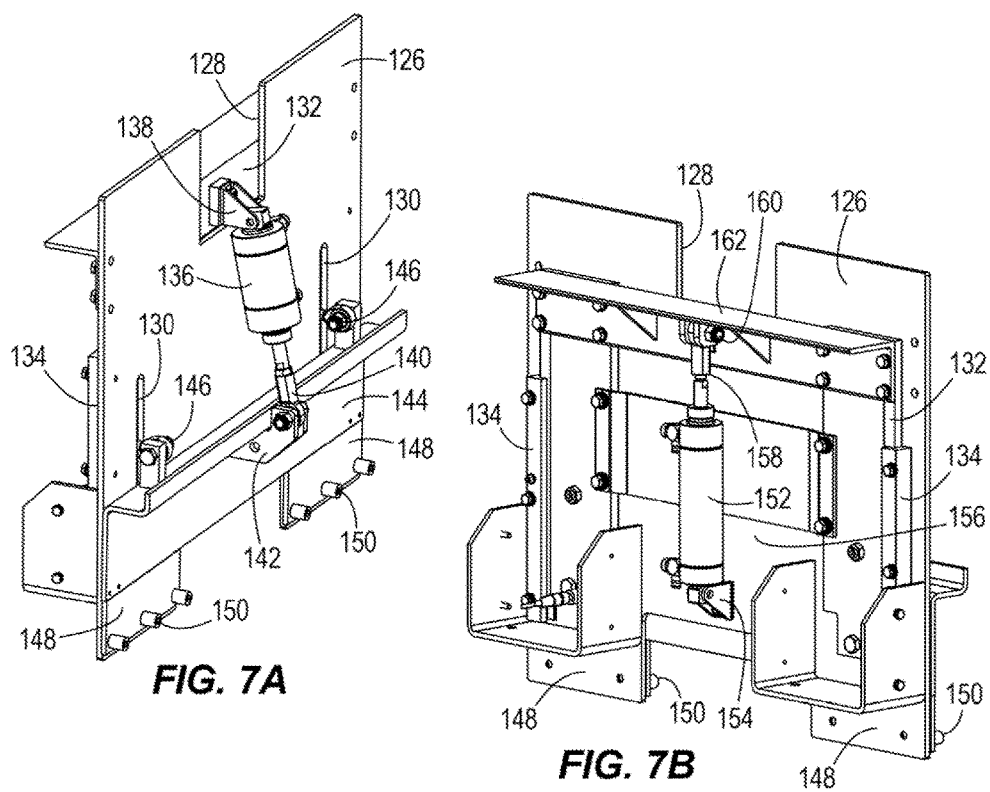
FIG. 7A
FIG. 7B

PALLET CHECKER

CROSS-REFERENCE TO RELATED APPLICATION

The present utility application relates to and claims priority to U.S. Provisional Patent Application No. 61/985,239, filed Apr. 28, 2014, which is herein incorporated by reference in entirety.

FIELD

The present disclosure relates to automated pallet checker apparatuses and to systems and methods for checking characteristics of a pallet.

BACKGROUND

The following U.S. patents and U.K. published application are incorporated herein by reference in entirety.

U.S. Pat. No. 4,743,154 discloses a pallet repair and inspection system including pallet destacking apparatus for automatically dispensing pallets from a stack of vertical pallets one at a time and discharging the pallets onto an inspection table. The destacking apparatus includes a vertically reciprocating table onto which the stack of pallets is driven, and horizontally reciprocating forks which are operated to suspend all but the lowermost pallet as the table is successively lowered and raised between a pallet discharge height and a pallet pick-up height, to discharge the pallets into the inspection table one at a time. The top of the inspection table is foldable to define a cradle for one end of the pallet, orienting the pallet generally vertically, and allowing inspection of its top and bottom surfaces.

U.S. Pat. No. 5,630,695 discloses a sorting machine having a lifting and rotating apparatus which includes a rotatable platform upon which a stack of pallets can rest so as to be supported from underneath. A scissor lift is provided for raising and lowering the stack so that the uppermost pallet is moved firstly to an inspection level where it is rotated with the rotatable platform for exposing its top and sides to an operator and then to a transfer level. The machine also has a support device having tynes which move into an extended position to support and maintain the pallet at the transfer level when the scissor lift is lowered to thereby expose the bottom of the pallet to the operator. A transfer carriage engages opposite sides of the pallet and supports the pallet from underneath. The pallet is then transported by the transfer carriage to one of a plurality of outfeed stations after the support device is moved into its retracted position.

U.S. Pat. No. 6,892,592 discloses an automated system for checking the structural integrity of pallets which, after suitable programming, checking operations and through special pliers can carry out further handling operations on the pallets between any combination of fixed surfaces. This system stacks pallets performing the typical functions of traditional stackers and de-stackers, and eliminating the needs of bulky transport paths and complex connecting deviations.

U.S. Pat. No. 7,340,971 discloses a system and method for inspecting pallets that verifies a pallet meets dimensional and structural integrity requirements for transporting a load. The method and automated system further verifies that a pallet is within tolerances for dimensions, the load-bearing surface of the pallet is free from large voids or damage, and that the pallet is able to withstand stress associated with a load and support. Pallets are rejected when one or more defects are found in the pallet as determined by signals from various inspection stations generated in response to performance of structural tests on the pallet.

U.S. Pat. No. 7,765,668 discloses an automatic pallet inspection cell comprising one or two multi axis robot arms which terminate in either internal or external pallet grippers. The robots are used to transport a gripped pallet through an automated inspection station which compiles a three dimensional data map of a pallet surface. A processor interprets the map and produces a recipe for the robot or robots. One or more stations conduct pallet repair operations that are specified by the map recipe. A method for levelling a pallet prior to board removal by a band saw is also disclosed, characterized by rolling the pallet relative to a blade of the band saw to a first and a second roll angle, and positioning the pallet at a position which is an average of the first and second roll angles.

U.S. Pat. No. 7,958,624 discloses an automated pallet inspection and repair apparatus which includes an inspection station and a repair station. The inspection station includes a laser that illuminates a pallet, a camera that collects the reflected light and a computer system. The computer system analyzes the output of the camera and acquires the pallet's geometry and topography. The design of the pallet is determined by the computer software. A decision to repair the pallet is made by comparing the acquired pallet data against the design criteria. If the pallet needs repair, a recipe of repair steps is constructed by inspecting each of the pallet's elements. The recipe is transmitted to the automated repair station.

U.K. Published Patent Application No. 2056681 discloses a pallet testing and sorting machine characterized by a gripper mechanism which by means of clamping or gripper jaws is adapted to lift and convey the top pallet from a stack thereof for testing. The machine includes a test mechanism to which the pallets are adapted to be fed individually by the gripper mechanism, and which comprises sensing strips adapted to be moved laterally against the pallet for testing the length and breadth dimensions. A plurality of pressers act on the loading surface to test the height dimension by subjecting a number of points to loading. An ejection mechanism is supplied for rejecting a pallet found to be defective by a test mechanism, and a stacking mechanism is provided for the pallets found to be non-defective by the test mechanism. The stacking mechanism is adapted to push each pallet beneath the raised stack.

SUMMARY

Through research and experimentation, the present inventors have determined that a need exists to design and construct an automated pallet checker to better facilitate checking the structural integrity of pallets, and sorting the pallets which have been checked. The inventors have found it desirable to provide an automated pallet checker system which efficiently inspects, detects and responds to the presence or absence of leading and trailing bottom pallet members, the presence or absence of material extending above a top pallet surface, the presence or absence of material depending from the pallet bottom surface and the presence or absence of defects in the leading and trailing edges of the pallet top surface.

In one example, the present disclosure relates to an automated pallet checker system for checking the structural integrity of a pallet having a set of top cross boards, a set of bottom cross boards and a set of stringers extending between the top cross boards and the bottom cross boards. The system includes a framework and a conveyor arrangement mounted on the framework and operable to convey the pallet to be checked through an in-feed station and a lift station connected to the in-feed station. The in-feed station is configured to check the pallet for a presence or an absence of the bottom cross boards as the pallet is carried on the conveyor arrangement. The lift station is configured to check for obstructions depending from the bottom cross boards, and missing material in leading and trailing edges of the top cross boards during a lifting movement of the pallet in the lift station. A controller is operatively connected to the conveyor arrangement, the in-feed station and the lift station, and is responsive to signals generated in the in-feed station and the lift station to determine whether the pallet being checked in the in-feed station and the lift station is acceptable or unacceptable.

In another example, the lift station of the pallet checker system includes a sensor arrangement providing a sensor beam arrangement extending across the front and rear ends of the lift station. A plurality of paddles is pivotally mounted on the front and rear ends of the lift station. The paddles are engaged by the leading and trailing edges of the top cross boards during the lifting movement of the pallet, and are moved into a position blocking the sensor beam arrangement to indicate the presence of the missing material along at least one of the leading and trailing edges, and to signal the controller that the pallet is unacceptable.

In a further example, the present disclosure relates to an automated pallet checker system for checking damage to a pallet having a set of top cross boards, a set of bottom cross boards and a set of stringers extending between the top cross boards and the bottom cross boards. The pallet checker system includes a framework, and a conveyor arrangement mounted on the framework and operable to convey the pallet to be checked through an in-feed station, a lift station connected to the in-feed station and a transfer station connected to the lift station. The in-feed station is configured to check the pallet for a presence or an absence of the bottom cross boards as the pallet is carried on the conveyor arrangement. The lift station is configured to check for defects in the bottom cross boards and the top cross boards during a lifting movement of the pallet in the lift station. A controller is operatively connected to the conveyor arrangement, the in-feed station, the lift station and the transfer station, and is responsive to signals generated in the in-feed station and the lift station to determine whether the pallet being checked in the in-feed station and the lift station is acceptable or unacceptable. The transfer station is configured to transfer an acceptable pallet from the lift station to a first collection station by means of the conveyor arrangement. The transfer station is also configured to transfer an unacceptable pallet to a second collection station spaced from the first collection station by means of a first transfer arrangement which transfers the unacceptable pallet laterally of the conveyor arrangement.

In an additional example, the present disclosure relates to a method for checking structural characteristics of a pallet having top members, bottom members and intermediate members between the top members and the bottom members. The method includes the steps of a) providing a conveyor arrangement mounted in a framework, and configured to convey the pallet to be checked through an in-feed station and a lift station connected to the in-feed station; b) providing a controller operatively connected to the conveyor arrangement, the in-feed station and the lift station, and configured to respond to signals generated in the in-feed station and the lift station indicative of the condition of the pallet conveyed through the in-feed station and the lift station; c) checking the pallet for the presence or absence of bottom members as the pallet is conveyed through the in-feed station to the lift station; d) checking the pallet for obstructions in the bottom members and damage to the top members during a lifting movement of the pallet in the lift station; and e) using the controller to determine whether the pallet being checked in the in-feed station and the lift station is acceptable or unacceptable.

BRIEF DESCRIPTION

FIG. 6 is an enlarged detail view of a paddle switch used in the pallet lift station shown in FIG. 5.

FIG. 7A is an enlarged detail view of an actuating arrangement used in the pallet lift station shown in FIG. 5.

FIG. 7B is an enlarged detail view of a lift arrangement used in the pallet lift station shown in FIG. 5.

Figure 9A:
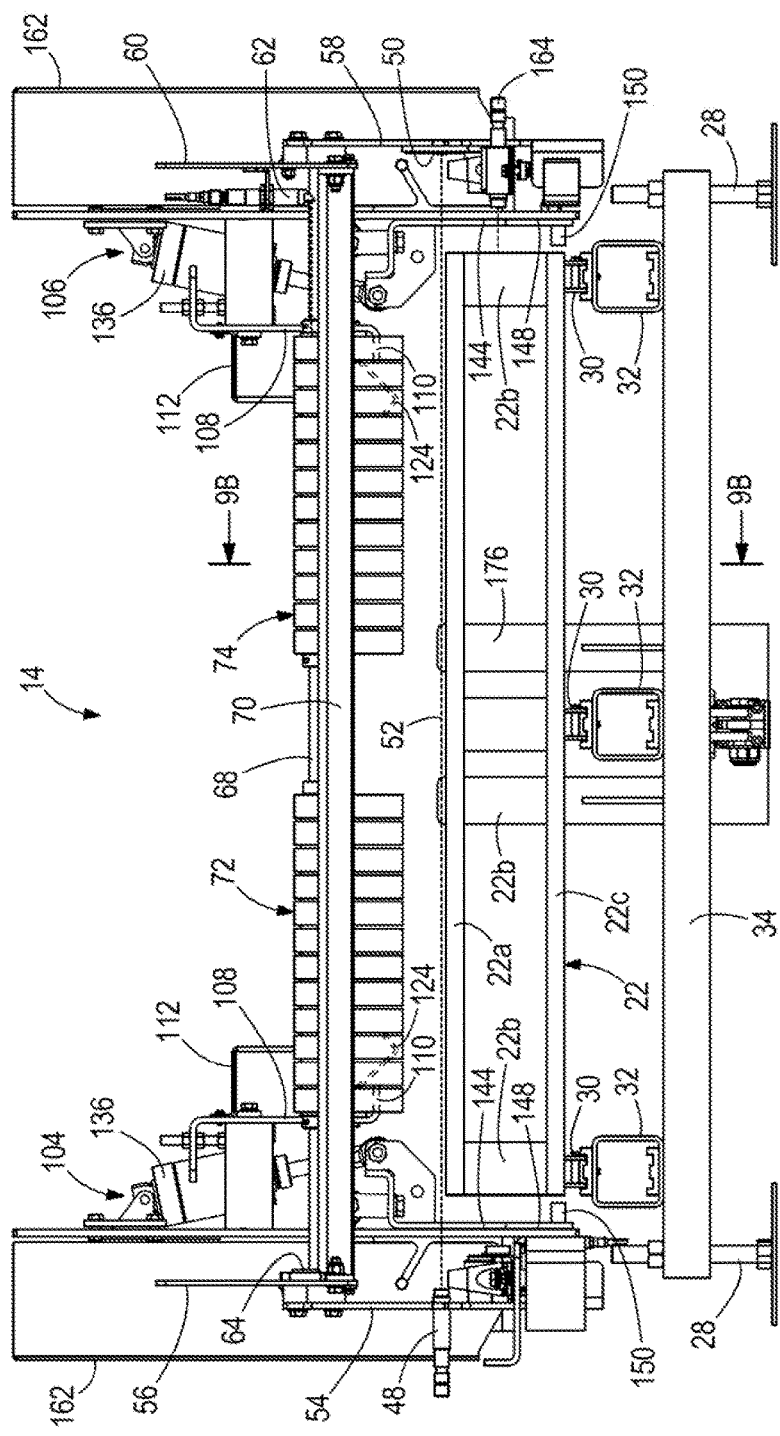
FIG. 9A is an end view of the pallet checker system shown in FIG. 8.

FIG. 10 OA is an end view similar to FIG. 9A showing the pallet in a raised position within the pallet lift station.

Figure 10A:
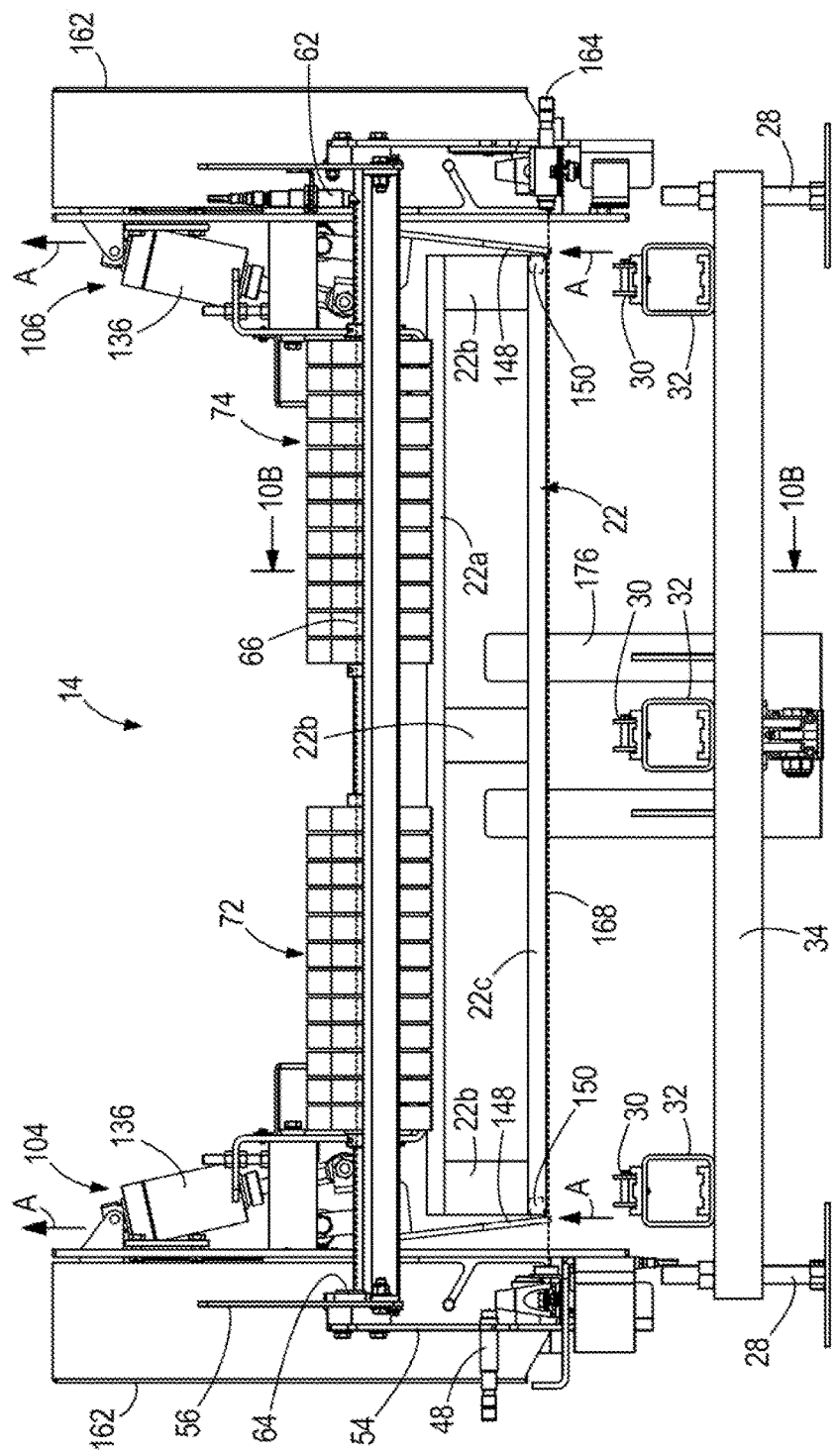
Figure 10B:
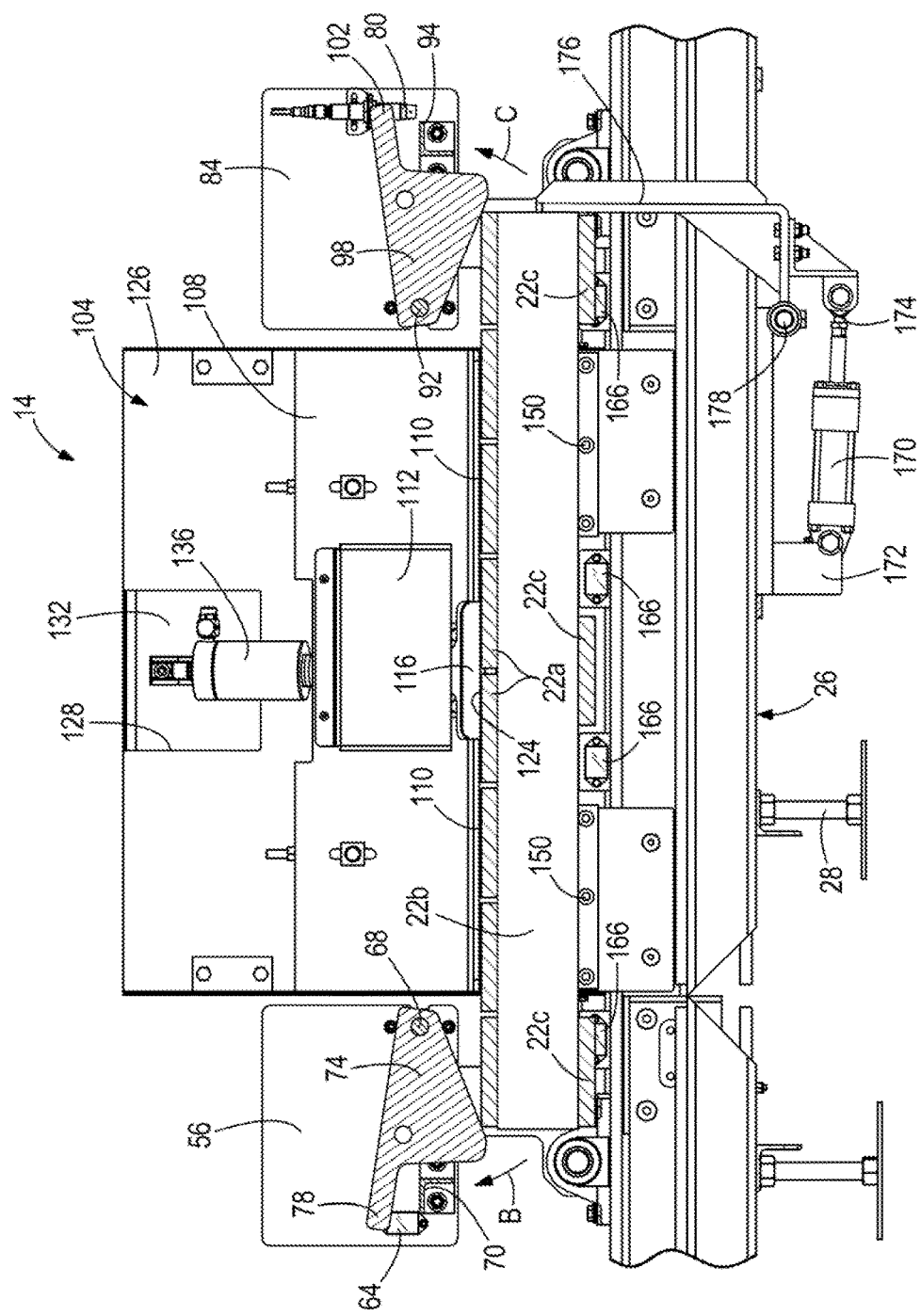

FIG. 10B is a sectional view of the pallet checker system taken on line 10B-10B of FIG. 10A.

Figure 11:
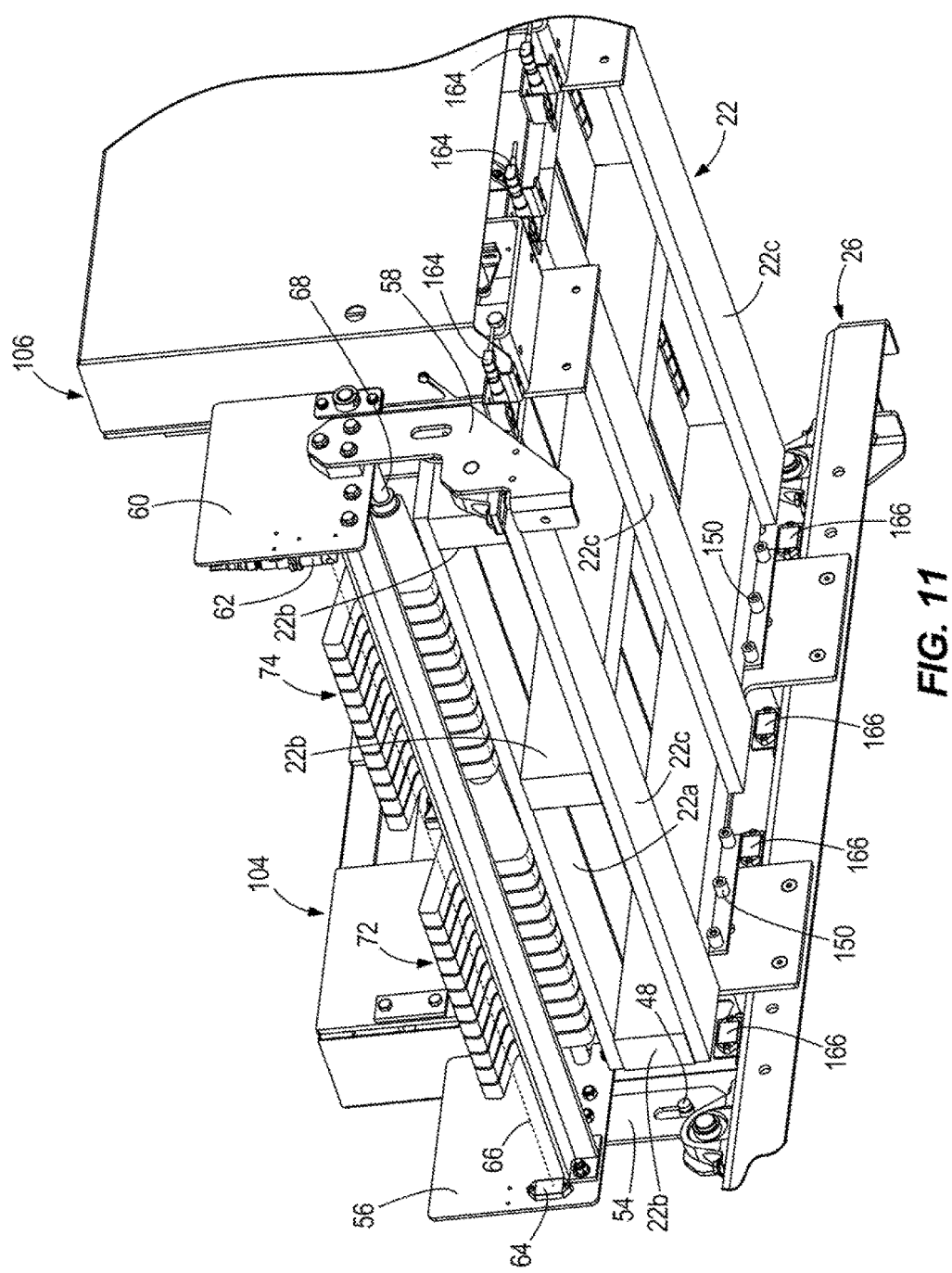

FIG. 11 is an enlarged bottom perspective view of the pallet checker system showing an example of the pallet of FIGS. 10A and 10 B having an acceptable trailing top edge.

Figure 12:
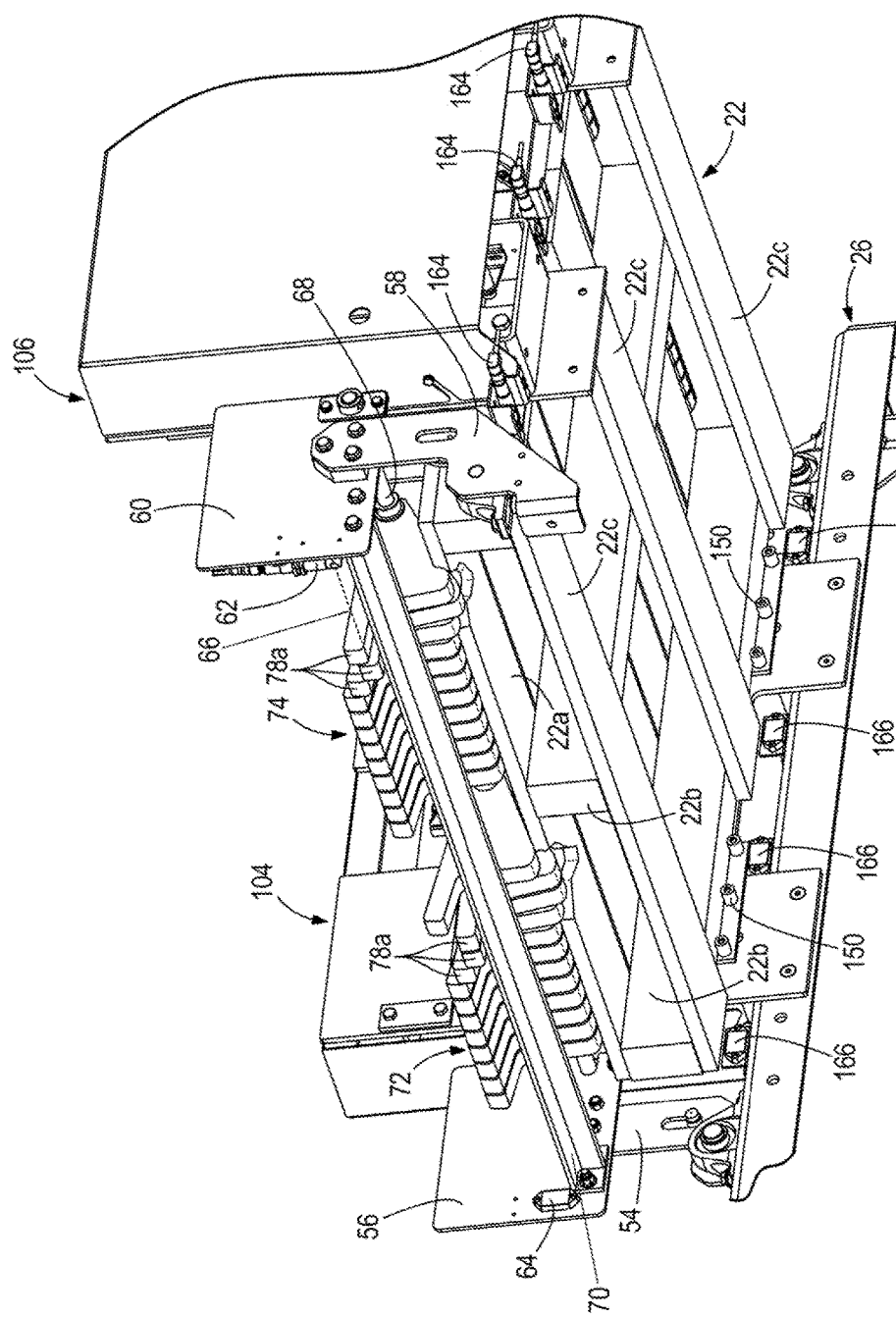

FIG. 12 is a view similar to FIG. 11 showing a further example of the pallet having an unacceptable trailing top edge.

DETAILED DESCRIPTION

Figure 1:
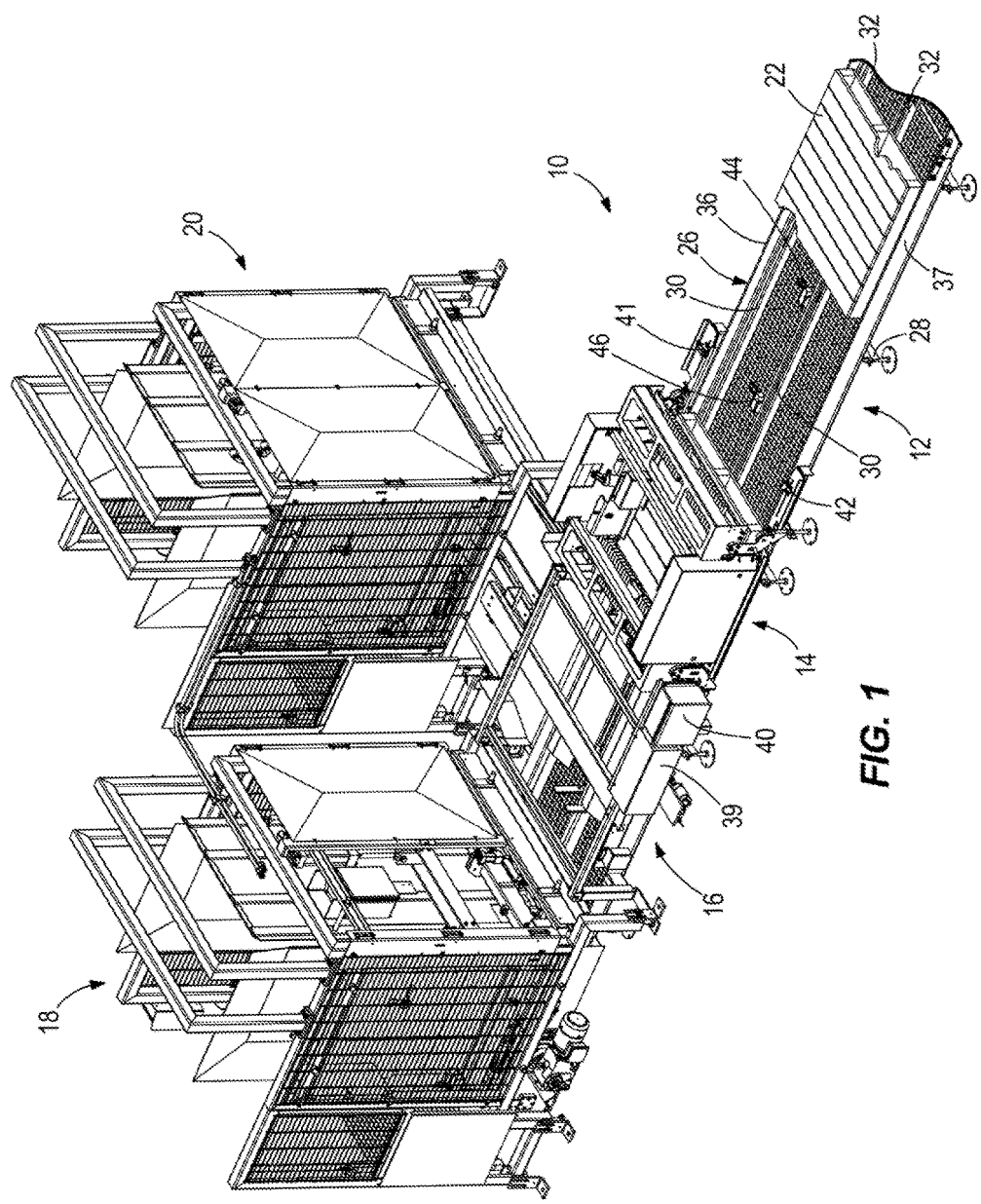
FIG. 1 is a front perspective view of a pallet checker system in accordance with the present disclosure.

Referring now to the drawings, an automated pallet checker system 10 is shown in FIG. 1 for checking the structural integrity of different pallets, and then sorting each checked pallet in areas where the checked pallets may be reused, repaired or discarded. The pallet checker system 10 includes an in-feed station 12, a lift station 14 and a transfer station 16. The transfer station 16 lies in communication with a first collection station in the form of a first "good pallet" magazine 18 designed to collect checked pallets which are found to be acceptable and reusable, and a second collection station in the form of a "bad pallet" magazine 20 designed to collect checked pallets which are rejected by the system 10 as being defective and which can be reinspected for repair or disposal. The first and second magazines 18 and 20 are commercially known products which receive and stack pallets, and do not, per se, form part of the present invention.

Figure 9B:
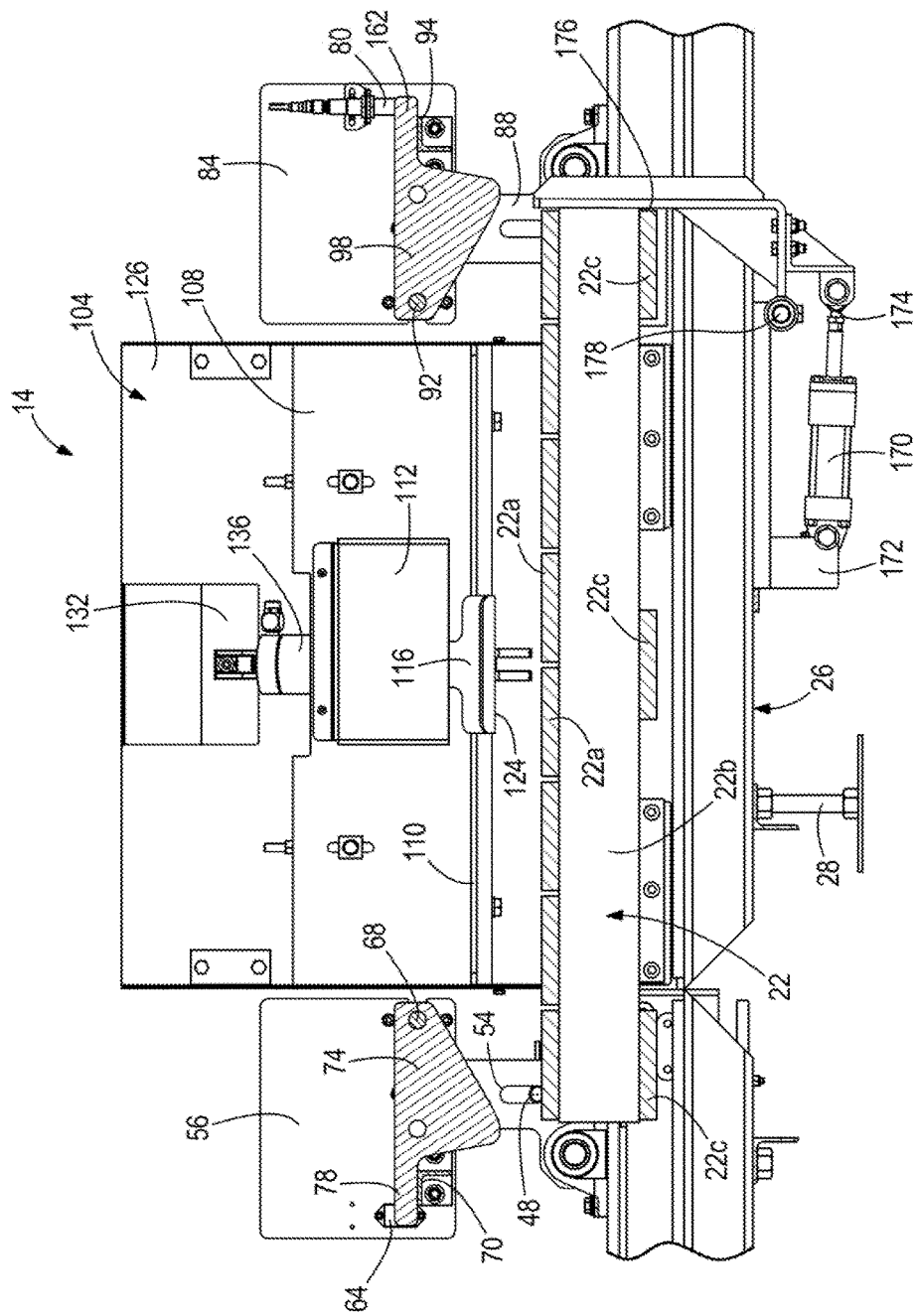
FIG. 9B is a sectional view of the pallet checker system taken on line 9B-9B of FIG. 9A.

The pallet checker system 10 is designed to be particularly useful in inspecting wooden pallets, one being identified by the reference numeral 22 in FIG. 1. As seen in FIGS. 9B and 11, such a pallet 22 typically includes a number of closely spaced cross boards 22a forming a top planar load bearing surface for supporting other items, a set of usually three spaced stringers 22b depending from and extending transversely to the top cross boards 22a and at least two and usually three spaced bottom cross boards 22c forming a bottom surface joined to the bottom of the stringers 22b and extending parallel to the top cross boards 22a. While the system 10 is primarily configured to check the structural integrity of the wooden pallet 22, the system 10 also receives and recognizes a plastic pallet 24 (FIG. 3) which is known to have a solid planar top surface 24a with depending stringers 24b forming the bottom surface. Once recognized, the plastic pallet 24 is designed to be passed through the system 10 to the first "good pallet" magazine 18 as will be further described below.

The system 10 includes an elongated framework 26 which is raised above a suitable support surface by a plurality of support legs 28. The framework 26 has an indexing conveyor arrangement defined by moving chains 30 which are operable to engage and convey the pallet 22 or 24 in the feed station to the lift station 14, the transfer station 16 and the "good pallet" magazine 18. As seen best in FIGS. 9A and 10A, the chains 30 run along the tops of and through a set of longitudinally extending beams 32 supported on various transverse cross members 34 of the framework 26. As will be understood, other suitable conveyor arrangements may also be used to transport the pallets 22, 24 from the in-feed station 12 to the lift station 14, the transfer station 16 and the magazine 18. The framework 26 includes guiderails 36, 37 that guide the sides of the pallets 22, 24 into the lift station 14 and maintain proper alignment with the in-feed station 12. In the exemplary embodiment, the pallets 22, 24 are provided to the in-feed station 12 having their top surfaces facing up and their bottom surfaces engaged by the chains 30.

The system 10 is equipped with a controller 38 (FIG. 2) located on the "bad pallet" magazine 20 although the controller 38 may be otherwise located in the system 10. The controller 38 is programmable and includes a computer processor, a memory, timer, and input-output device. The processor loads and executed software and data, which can be stored in the memory. Executing the software controls the system 10 to operate as described herein in further detail below. The processor can comprise a microprocessor and/or circuitry that receives and executes software. The processor can be implemented within a single device, but can also be distributed across multiple processing devices and/or subsystems that cooperate in executing program instructions. Examples include general purpose central processing units, application specific processors, and logic devices, as well as any other processing device, combination of processing devices, and/or variations thereof. The controller 38 communicates with various components of the system 10 via wired and/or wireless link(s). The controller 38 can have one or more microprocessors that are located together or remotely from each other in the system 10 or remotely from the system 10.

The memory can include any storage media that is readable by the processor and capable of storing software and data. The memory can include volatile and/or nonvolatile removable and/or non-removable media implemented in any method or technology for storage of information, such as computer readable instructions, data structures, program modules, or other data. The memory can be implemented as a single storage device but may also be implemented across multiple storage devices or subsystems. The memory can further include additional elements such as a device capable of communicating with the processor. Examples of storage media include random access memory, read only memory, magnetic discs, optical discs, flash memory discs, virtual and/or non-virtual, magnetic cassettes, magnetic tape, magnetic disc storage, or other magnetic storage devices, or any other medium which can be used to store the desired information that may be accessed by an instruction execution system, as well as any combination or variation thereof, or any other type of storage media. In some implementations, the storage media can be non-transitory storage media.

The input-output device can include any one of a variety of conventional computer input-output interfaces for receiving electrical signals for input to the controller 38 and for sending electrical signals from the controller 38 to various components of the system 10. The controller 38, via the noted input-output device, communicates with components of the system 10 via communication links, which as mentioned herein above can be wired or wireless link(s). The controller 38 is capable of monitoring and controlling operational characteristics of the system 10 by sending and/or receiving control signals via the various links. The controller 38 relies upon the memory for storing data and suitable input/output circuits for receiving electronic signals from various sensors in order to determine whether a checked pallet is found to be acceptable or unacceptable for use, and for sending suitable commands to the conveyor arrangement and various actuating mechanisms in the system 10 to be described in detail below. Such actuating systems include, for example, control valves 39 and air valves 40. In the exemplary embodiments, it should be understood that the sensors disclosed herein can be adjusted to establish the desired parameters which define acceptable and unacceptable pallets.

Figure 3:
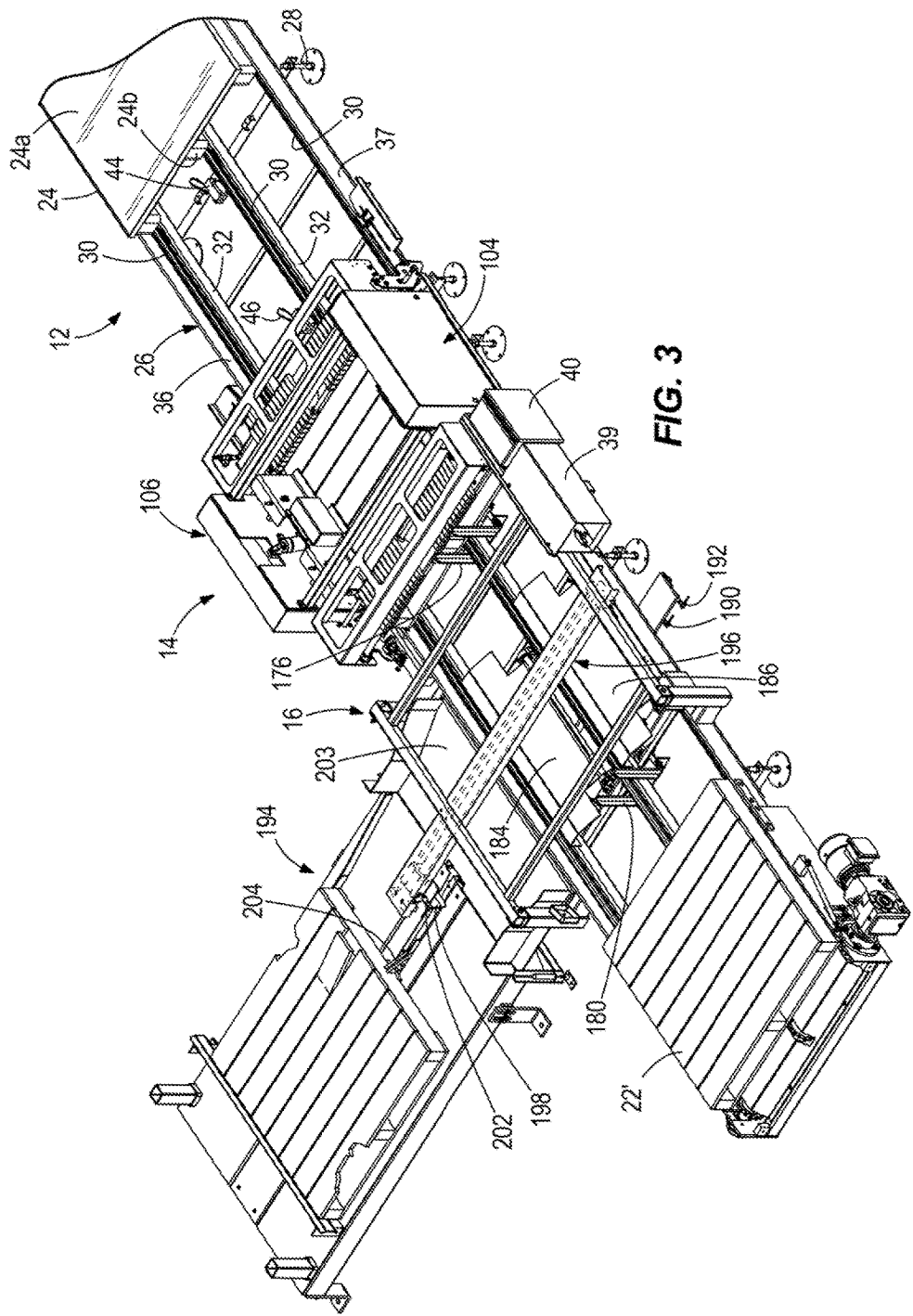
FIG. 3 is a partial rear perspective view of the pallet checker.
Figure 5:
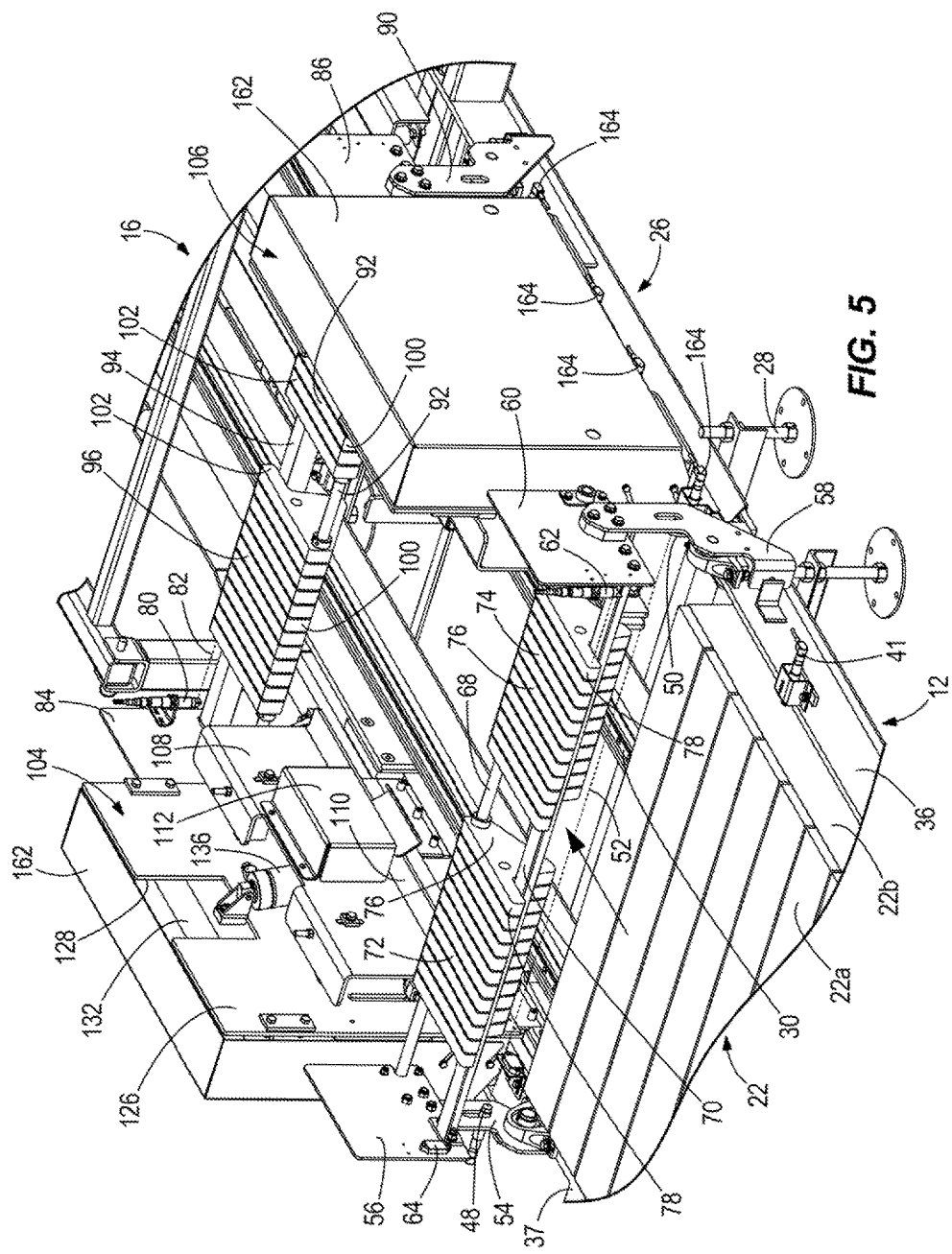
FIG. 5 is an enlarged partial perspective view of the pallet checker system showing a pallet being transported from a pallet in-feed station to a pallet lift station.

As seen in FIGS. 1, 3 and 5, the in-feed station 12 is constructed with a first sensor arrangement in the form of a first photo eye 41 on the guiderail 36 which cooperates with a first reflector 42 on the guiderail 37 to provide a first sensor beam projecting between the guiderails 36, 37. The in-feed station 12 is also provided with a pair of longitudinally spaced limit switches 44, 46 which are attached to the middle beam 32 as seen in FIG. 3. The photo eye 41 and the limit switches 44, 46 are operatively connected to the controller 38. The limit switches 44, 46 are designed to be used in checking for the presence or absence of leading and trailing bottom boards 22c on the pallets 22.

Figure 8:
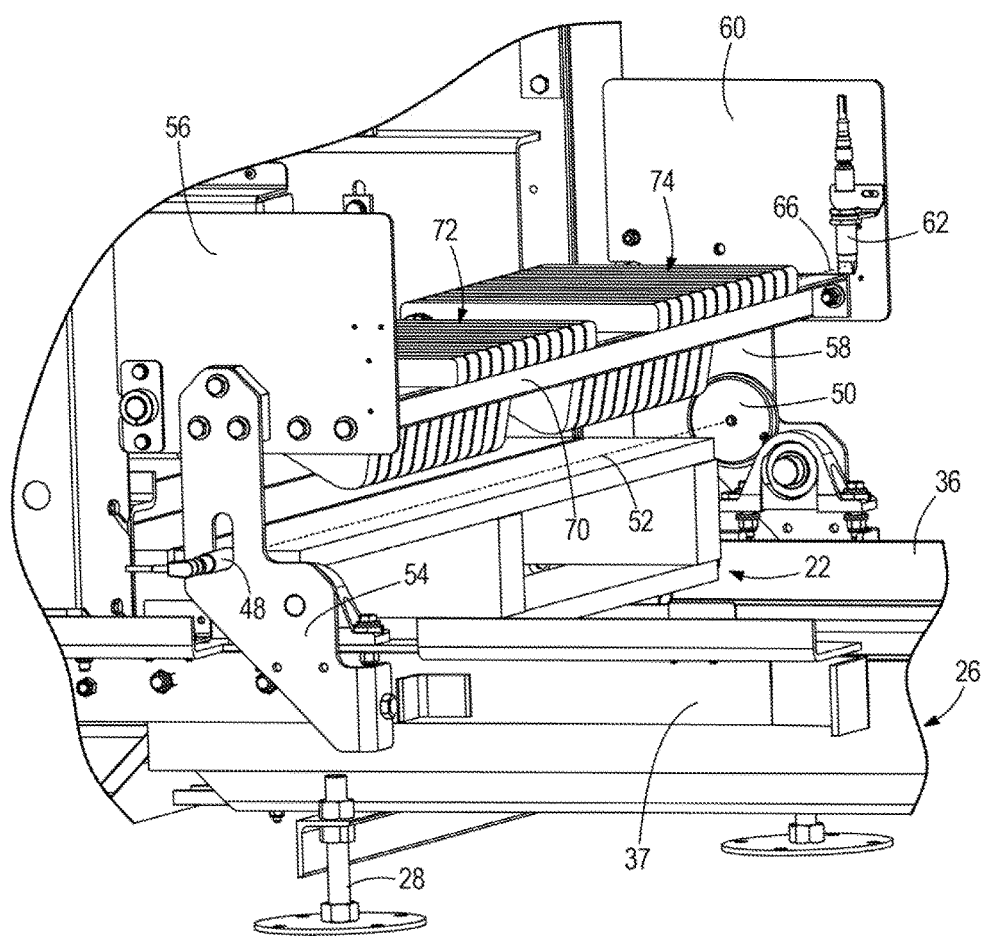
FIG. 8 is an enlarged partial perspective view of the pallet checker system showing a trailing edge of the pallet in a lowered position in the pallet lift station shown in FIG. 5.

As further seen in FIGS. 5 and 8, the lift station 14 includes a second sensor arrangement in the form of a second photo eye 48 which cooperates with a second reflector 50 to provide a second sensor beam 52 projecting across and above the guiderails 36, 37. The second photo eye 48 is held in a slot of a support arm 54 extending between the guiderail 37 and a first forward facing end plate 56. The second reflector 50 is retained on a support arm 58 extending between the guiderail 36 and a second forward facing end plate 60. The second photo eye 48 is operatively connected to the controller 38, and is designed so that the sensor beam 52 is projected over the top surface of the pallet 22 as the pallet moves from the in-feed station 12 into the lift station 14 to monitor an acceptable desired height of the pallet 22 and to check for any obstructions rising from the top surface of the pallet 22.

At the front of the lift station 14, a third sensor arrangement in the form of a third photo eye 62 (FIG. 5) cooperating with a third reflector 64 provides a third sensor beam 66 projecting above the sensor beam 52. The third photo eye 62 is secured on the end plate 60 while the third reflector 64 is attached to the end plate 56. A cylindrical shaft 68 is fixed between rear portions of the end plates 56, 60, and a rest bar 70 is mounted between forward positions of the end plates 56, 60. A first plurality of paddles 72 is spaced from a second plurality of paddles 74 which are identical to paddles 72. The paddles 72, 74 include tapered portions 76 which are pivotally mounted about the shaft 68, and nose portions 78 which normally are supported upon the rest bar 70.

At the rear of the lift station 14, a fourth sensor arrangement in the form of a fourth photo eye 80 cooperating with a fourth reflector (not shown) provides a fourth sensor beam 82 which is parallel to the third sensor beam 66. The fourth photo eye 80 is mounted on a first rearward facing end plate 84, and the fourth reflector is attached to a second rearwardly facing end plate 86. The end plate 84 is joined to a support arm 88 (FIG. 4) fixed to the framework 26, and the end plate 86 is attached to a support arm 90 (FIG. 5) also connected to the framework 26. A cylindrical shaft 92 is joined between forward portions of the end plates 84, 86, and a rest bar 94 extends between rear portions of the end plates 84, 86. A third plurality of paddles 96 is spaced from a fourth plurality of paddles 98 which are identical to paddles 96. The paddles 96, 98 include tapered portions 100 which are pivotally mounted about shaft 92, and nose portions 102 which are normally supported on the rest bar 94. The third photo eye 62 and the fourth photo eye 80 are operatively connected to the controller 38, and are designed to be used in checking the structural integrity of the pallets 22 at the leading and trailing edges thereof. A more detailed description of the operation of the paddles 72, 74, 96, 98 and the photo eyes 62 and 80 is provided below.

Opposite sides of the lift station 14 are provided with respective lift assemblies 104, 106 mounted on the framework 26, and defining a lift arrangement for supporting various operating components to effect selective engagement, disengagement and vertical movement of the pallet 22 in response to the pallet 22 satisfying certain structural prerequisites upon entering the lift station 14.

Referring to FIGS. 5-7B, 9A, 9B, 10A and 10B, each of the lift assemblies 104, 106 is identical and, for purposes of simplicity, only the lift assembly 104 will be described. The lift assembly 104 includes a mounting plate 108 having an inwardly extending stop ledge 110 integrally formed therewith and a protective housing 112 attached thereto. The housing 112 partially encloses a fifth photo eye 114 (FIG. 6) fixed to the mounting plate 108 for providing a fifth sensor beam which is designed to project forwardly towards the paddles 72. A paddle switch 116 is partially protected by the housing 112, and is mounted for limited pivotal movement about a shaft 118 attached to the mounting plate 108 by two mounting bars 120. The paddle switch 116 has an upper bifurcated end 122 which is normally displaced from the sensor beam of the fifth photo eye 114 as shown in solid lines in FIG. 6. The paddle switch 116 has a lower angled edge 124 which, upon engagement with a top surface of the pallet 22, can be moved to a dotted line position along with the upper end 22 causing an obstruction of the sensor beam from the fifth photo eye 114, and sending a signal to the controller 38 as will be further described hereafter.

Referring now to FIGS. 7A and 7B, the lift assembly 104 further includes a fixed mounting plate 126 attached to mounting plate 108 and having a cutout 128 formed on an upper end, and a pair of slots 134 formed therethrough. A lift plate 132 is mounted for limited vertical movement within guides 134 attached to an outer surface of the mounting plate 126. An engagement cylinder 136 has an upper end pivotally attached to a clevis 138 fixed to an upper end of the moveable lift plate 132. An extendable and retractable rod end 140 is pivotally connected to a bifurcated bracket 142 which is joined to a lower plate 144. Upper ends of the lower plate 144 are provided with pivotal connectors 146 which extend through the slots 130, and are connected to the lift plate 132. The lower plate 144 is provided with depending spaced extensions 148, each having a series of three inwardly projecting fingers 150. A lift cylinder 152 has a casing end fixed by a bracket 154 to a fixed inner plate 156. The lift cylinder 152 has an extendable and retractable rod end 158 connected to a bracket 160 attached to a bent upper portion 162 of the moveable lift plate 132. Protective enclosures 162 are provided on outside surfaces of the fixed plates 126 to shield the lift cylinders 152.

The lift assemblies 104, 106 are operatively connected to the controller 38, and are designed to selectively engage and disengage bottom surfaces of the pallet 22 so that the pallet 22 may be selectively raised and lowered. Actuation of the engagement cylinders 136 as prompted by the controller 38 causes the lower plates 144 and fingers 150 to pivot from the pallet disengaged positions shown in FIG. 9A to the pallet engaged positions shown in FIG. 10 OA. In the latter positions, the fingers 150 are engaged with the lower surfaces of the outermost stringers 22b between the middle bottom board 22c and the leading bottom board 22c, and between the middle bottom board 22c and the trailing bottom board 22c as illustrated in FIG. 10B. Thereafter, actuation of the lift cylinders 152 raises the lift plate 132 along with the engagement cylinders 136 relative to the cutouts 128 in the fixed plate 126 to lift the pallet 22 until the center top boards 22a abut the stop ledges 110 and engage the lower angled edges 124 of the paddle switches 116. Upon pallet engagement, the paddle switches 116 are pivoted (as shown in phantom lines of FIG. 6) so that the upper ends 122 move into and interrupt the paths of the beams provided by the fifth photo eyes 114 sending further signals to be processed by the controller 38 as will be further described below.

Referring to FIG. 5, a set of four spaced sixth photo eyes 164 are positioned on the framework 26 below the enclosure 162 for the lift assembly 106. The four photo eyes 164 are aligned with corresponding reflectors 166 (FIG. 10B) mounted on the framework 26 below the enclosure 162 for the lift assembly 104. As seen in FIG. 10A, each photo eye 164 and reflector 166 cooperate to provide a sixth sensor beam 168. The photo eyes 164 are connected to the controller 38, and are designed to check for hanging bottom boards 22c as the pallet 22 is lifted in the lift station 14.

Referring to FIGS. 4, 9A, 9B, 10A and 10B, an actuating cylinder 170 has a casing end connected to a bracket 172 depending from the bottom of framework 26. The cylinder 170 has an extendable and retractable end 174 joined to a plate structure 176 defining a first pallet stop that is pivotally connected about a pivot tube 178 joined to a bottom of the framework 26. The cylinder 170 is selectively actuated to move the first pallet stop 176 from a horizontal retracted position to a vertical position for engagement with a leading end of the pallet 22. In the vertical position, the first pallet stop 176 prevents further downstream movement of the pallet once it has entered the lift station 14.

Figure 2:
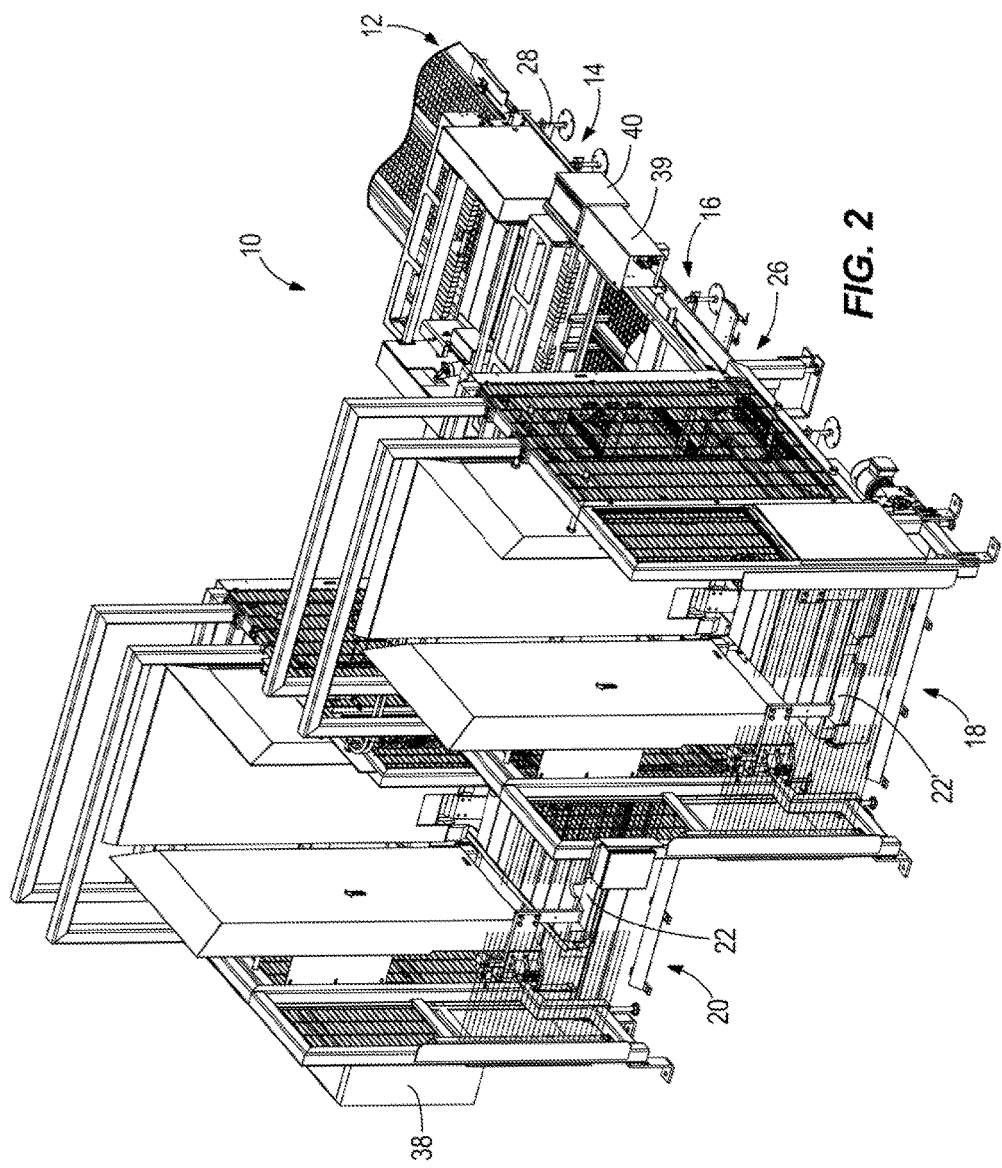
FIG. 2 is a rear perspective view of the pallet checker system shown in FIG. 1.

Once top and bottom surfaces of the pallet 22 in the lift station 14 have been checked for certain structural criteria, the pallet is lowered back onto the conveyor chains 30 and the first pallet stop 176 is lowered so that the pallet 22 may be conveyed out of the lift station 14. If the pallet 22 has been found to be structurally acceptable, the pallet 22 is conveyed through the transfer station 16 for delivery to the "good pallet" magazine 18. Acceptable pallets designated as reference numeral 22' in FIGS. 2 and 3, are then automatically stacked one on top of the other in the magazine 18 as depicted in FIG. 2. Once a suitable number of acceptable pallets 22' have been collected in the magazine 18, the system 10 signals that the magazine 18 if full and must be emptied by an operator who can put the pallets 22' back into use. However, if the pallet 22 checked in the in-feed station 12 or the lift station 14 has been found to be structurally defective and unacceptable for further use, the "bad pallet" 22 is conveyed to the transfer station 16 for further handling therein.

Figure 4:
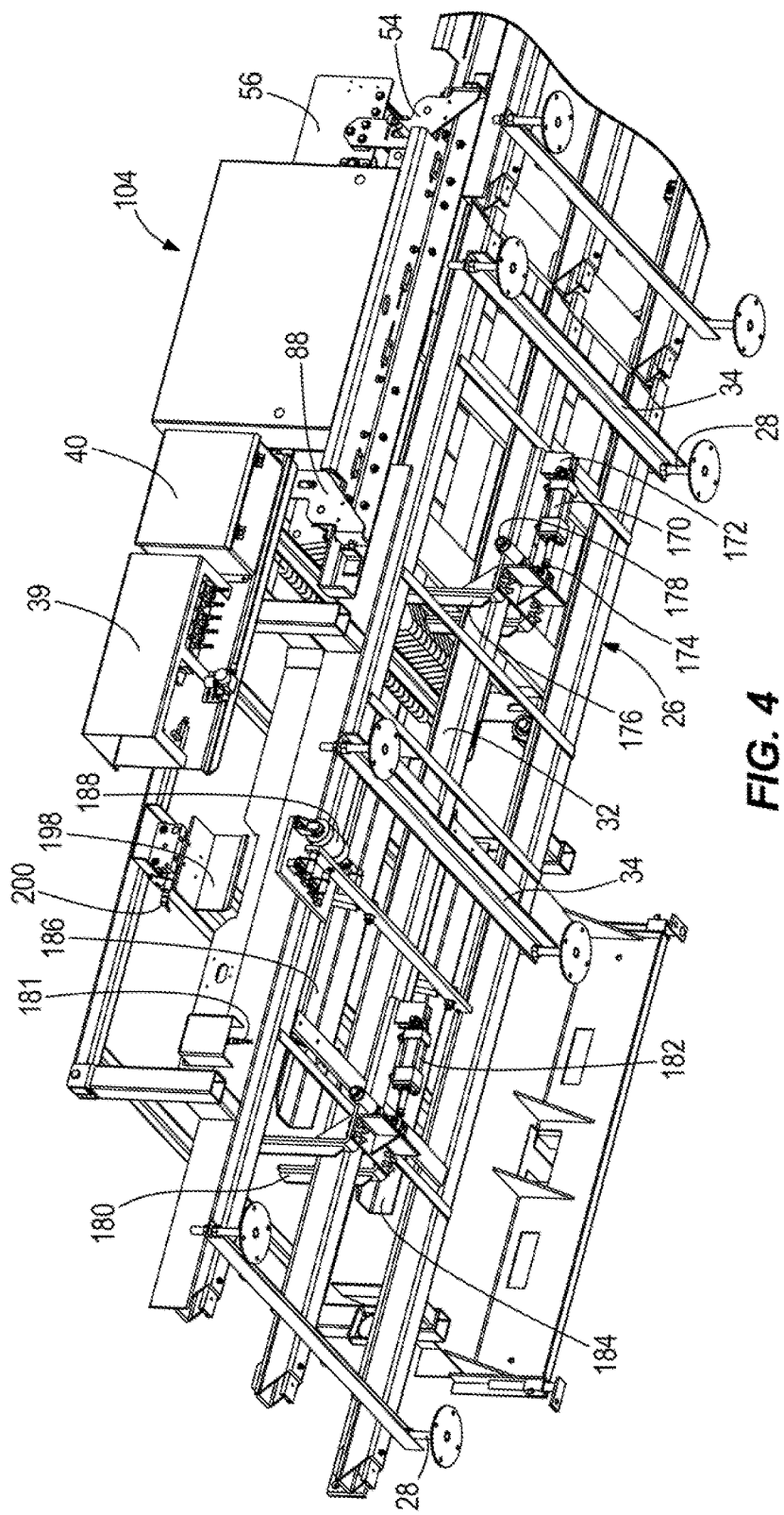
FIG. 4 is partial bottom perspective view of the pallet checker system shown in FIG. 3.

Referring now to FIGS. 3 and 4, a downstream end of the transfer station 16 is provided with a second pallet stop 180 similar to the first pallet stop 176. Selective actuation of an actuating cylinder 182 positioned on a bottom of the framework 26 moves the second pallet stop 180 between a horizontal retracted position and a vertical position for preventing further downstream movement of the defective pallet 22 beyond the transfer station 16. A photo eye 181 (FIG. 4) can be provided on the framework 26 to sense the leading edge of the pallet 22 in the transfer station 16 and coordinate movement of the second pallet stop 180. A pair of ramped lift plates 184, 186 are pivotally mounted at the bottom of the framework 26, and moved between a lowered position and a raised position by means of an actuating cylinder 188. The actuating cylinder 188 cooperates with photo eyes 190, 192 to sense the lowered and raised positions of the lift plates 184, 186. With the lift plates 184, 186 in the raised position, the defective pallet 22 in the transfer station 16 can be transferred down the ramped lift plates 184, 186 to a laterally extending discharge framework 194 forming part of the transfer station 16 by actuation of a first transfer arrangement 196. The discharge framework 194 extends generally perpendicularly to the framework 26, and joins the transfer station 16 with the "bad pallet" magazine 20. In one example, the first transfer arrangement 196 includes an overhead air cylinder (not shown) operatively connected to a pusher plate 198 which is selectively engageable with the defective pallet 22 after the lift plates 184, 186 have been raised. The pusher plate 198 is moveable from a retracted position (shown in FIG. 4) to an extended position (shown in FIG. 3). The pusher plate 198 works together with seventh and eighth photo eye detectors 200, 202 for providing sensor beams used to sense the absence or presence of the pusher plate 198 in its retracted and extended positions. Upon pushing the defective pallet 22 into a ramped portion 203 of the discharge framework 194, the defective pallet 22 is further engaged by a second transfer arrangement 204 in the form of a moveable dog as seen in FIG. 3. The second transfer arrangement 204 is designed to convey the defective pallet 22 into the "bad pallet" magazine 20 for stacking with other defective pallets 22. The system 10 will provide a signal to the operator when the magazine 20 is full and must be emptied. Defective pallets 22 are then either repaired or discarded. The system will also provide an alarm signal if the magazine 20 is unable to stack the defective pallet 22 because of its particular damaged condition.

A sequential exemplary operation of the system 10 will now be described.

Referring to FIG. 1, as the wooden pallet 22 is moved in the in-feed station 12 by the chains 30 towards the lift station 14, the leading edge of the pallet 22 breaks the sensor beam provided by the first photo eye 41. Breaking of the sensor beam causes the limit switches 44, 46 to sense whether there is a cross board 22c on the bottom surface at both the leading and trailing edges of the pallet 22. The presence of bottom cross boards 22c at both ends of the pallet initially qualifies the pallet 22 as being acceptable.

The controller 38 is configured to communicate with the photo eye 41 to determine whether the pallet 22 broke the sensor beam and whether the limit switches 44, 46 had been made. If both of these conditions are verified, the controller 38 is programmed to recognize that the pallet 22 is, in fact, a wooden pallet and that initially the pallet 22 may continue for further structural checking in the downstream lift station 14. If either one of the limit switches 44, 46 is not made at the time the pallet 22 breaks the sensor beam of the photo eye 41, the controller 38 is programmed to determine that one of the leading and trailing bottom boards 22c is missing and that the pallet 22 is defective. As a result, the pallet 22 is automatically rejected and the controller 38 operates to convey the unacceptable pallet 22 through the lift station 14 with the first pallet stop 176 in the retracted position to the transfer station 16 within which the defective pallet 22 is restrained against further downstream movement by the second pallet stop 180 in a vertical position. The defective pallet 22 in the transfer station 16 is then lifted by the lift plates 184, 186, and transferred by the first transfer arrangement 196 and the second transfer arrangement 204 to the "bad pallet" magazine 20.

The two limit switches 44, 46 also are configured to differentiate between the plastic pallets 24 that do not have bottom cross boards and the wooden pallets 22 that do. The controller 38 is programmed to determine that the pallet is a plastic pallet 24 when the plastic pallet 24 breaks the beam of the photo eye 41 and the limit switches 44, 46 do not see either leading or trailing pallet boards 22c (because there are no cross boards to make those limit switches). The controller 38 is programmed to monitor when and if the pallet 24 continues through that photo eye beam to make sure that no other actuations make the limit switches 44, 46 on the way as it passes through. This tells the controller 38 that it is a plastic pallet 24, and it should be conveyed by the chains 30 through the lift station 14 and the transfer station 16 directly to the "good pallet" magazine 18. The controller 38 does not check the bad boards on the plastic pallet 24. It is just a send through scenario in that respect.

If both the leading and trailing bottom boards 22c of the pallet 22 are present and the controller 38 verifies that the pallet 22 is initially acceptable, the chains 30 move the pallet 22 into the lift station 14 and the first pallet stop 176 is raised to the vertical position. As the pallet 22 enters the lift station 14, the second sensor beam 52 (FIG. 9A) provided by the photo eye 48 is projected over the top boards 22a of the pallet 22. If any of the top boards 22a break the sensor beam 52 as the pallet 22 travels into the lift station 14, the photo eye 48 will signal that the pallet 22 is unacceptable, and will lower the pallet stop 176 and send the pallet 22 to the transfer station 16 where it is transferred to the "bad pallet" magazine 20 as described above.

If the pallet 22 is clear above the top boards 22a upon the leading edge of the pallet 22 engaging the first pallet stop 176, the controller 38 actuates the engagement cylinders 136 so that the fingers 150 will engage the bottom surfaces of the stringers 22b (FIG. 10B) as previously described. With the fingers 150 engaging the pallet 22, the lift cylinders 152 will raise the pallet 22 as well as the lift plate 132 as represented by the arrows A in FIG. 10A. As a pallet 22 is lifted, the sensor beams 168 are used to check for any loose bottom boards 22c. Upon breaking of any of the sensor beams 168, signals are sent to the controller 38 that the pallet 22 is defective and needs to be rejected. As a result, the controller 38 causes the defective pallet 22 to be lowered and released onto the chains 30 so that with the pallet stop 176 retracted, it can be conveyed to the transfer station 16 and sent to the "bad pallet" magazine 20.

If the pallet 22 continues to be raised without the system 10 detecting any loose hanging bottom boards 22c, the center top cross boards 22a come into abutment with the stop ledges 110 and the angled edges 124 of the paddle switches 116 as depicted in FIG. 10B. As previously described, the paddle switches 116 are pivoted causing obstruction of the sensor beams provided by the photo eyes 114 so that the lift cylinders 152 are de-energized and the pallet 22 is held in the raised position.

At this time, the leading and trailing edges of the top boards 22a of the pallet come into contact with the paddles 72, 74, 96, 98. If the leading and trailing edges of the top boards 22a are uniformly intact as represented in FIGS. 10B and 11, the paddles 72, 74 will be pivoted about the shaft 68 in the direction of arrow B causing the nose portions 78 of the paddles 72, 74 to be equally raised from the rest bar 70. Simultaneously, the paddles 96, 98 will be pivoted about the shaft 88 in the direction of arrow C such that the nose portions 102 are equally lifted from rest bar 90. If the leading and trailing edges of the top boards 22a are intact, the sensor beam 66 (FIGS. 5 and 11) and the sensor beam 82 (FIG. 5) are clear and free of obstructions which signals the controller 38 that the pallet 22 is in an acceptable condition. Signals are sent to the controller 38 that the pallet 22 is acceptable causing the pallet 22 to be lowered and released on the chains 30, the pallet stop 180 to be lowered and the pallet 22 to be conveyed to the "good pallet" magazine 18.

However, in the event that the leading and trailing edges of the top boards 22a have missing material, the sensor beams 66 and 82 would be obstructed and cause the pallet 22 to be found defective. An example of this case is shown in FIG. 12, where the missing material on the trailing top edge of the pallet 22 does not cause the paddles 72, 74 to be uniformly raised such that nose portions 78a in the area of the missing material interrupt or block the sensor beam 66. This sensor beam blockage sends a signal to the controller 38 that the pallet 22 is unacceptable at which point the pallet 22 is lowered and released on the chains 30 and conveyed to the transfer station 16 for side discharge to the "bad pallet" conveyor 20.

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims.

What is claimed is:

1. An automated pallet checker system for checking the structural integrity of a pallet having a set of top cross boards, a set of bottom cross boards and a set of stringers extending between the top cross boards and the bottom cross boards, the system comprising:
    a framework;
    a conveyer arrangement mounted on the framework and operable to convey the pallet to be checked through an in-feed station, and a lift station connected to the in-feed station;
    the in-feed station being configured to check the pallet for a presence or an absence of the bottom cross boards as the pallet is carried on the conveyor arrangement;
    the lift station being configured to check the pallet for any obstruction depending from the bottom cross boards, and missing material in leading and trailing edges of the top cross boards during a lifting movement of the pallet in the lift station; and
    a controller operatively connected to the conveyor arrangement, the in-feed station and the lift station and responsive to signals generated in the in-feed station and the lift station to determine whether the pallet being checked in the in-feed station and the lift station is acceptable or unacceptable.

2. The pallet checker system of claim 1, wherein the lift station is further configured to check the pallet for obstructions rising from the top cross boards as the pallet is transferred by the conveyor arrangement from the in-feed station to the lift station.

3. The pallet checker system of claim 1, wherein the conveyor arrangement is operable to convey the pallet from the lift station following a lowering movement of the pallet therein to a transfer station connected to the lift station.

4. The pallet checker system of claim 3, wherein the transfer station is configured to transfer an acceptable pallet from the lift station to a first collection station by means of the conveyor arrangement.

5. The pallet checker system of claim 4, wherein the transfer station is configured to transfer an unacceptable pallet from the lift station to a second collection station spaced from the first collection station by means of a transfer arrangement which transfers the unacceptable pallet laterally of the conveyor arrangement.

6. The pallet checker system of claim 1, wherein the in-feed station includes a first sensor arrangement and a limit switch arrangement mounted on the framework and operatively connected with the controller.

7. The pallet checker system of claim 6, wherein the lift station includes a second sensor arrangement mounted on the framework for providing a sensor beam directed over the top cross boards of the pallet as the pallet is carried from the in-feed station to the lift station.

8. The pallet checker system of claim 7, wherein the lift station includes a paddle arrangement pivotally mounted in the lift station, and configured to pivot upon engagement with the top cross boards of the pallet during the lifting movement.

9. The pallet checker system of claim 7, wherein the lift arrangement includes a third sensor arrangement mounted on the framework at a front end of the lift station for sensing a presence or absence of the paddle arrangement during the lifting movement of the pallet.

10. The pallet checker system of claim 9, wherein the lift station includes a fourth sensor arrangement mounted on the framework at a rear end of the lift station for sensing a presence or absence of the paddle arrangement during the lifting movement of the pallet.

11. The pallet checker system of claim 10, wherein the lift station includes a lift arrangement mounted on the framework and having at least one movable lift plate operatively connected with a set of fingers which are engaged and disengaged with bottom surfaces of the pallet by means of an engagement cylinder arrangement connected to the lift plate.

12. The pallet checker system of claim 11, wherein the lift arrangement also includes a lift cylinder arrangement for raising and lowering the lift plate, the engagement cylinder arrangement and the fingers.

13. The pallet checker system of claim 12, wherein the lift station includes a paddle switch arrangement pivotally attached to a mounting plate arrangement and engaged and disengaged by the top cross boards of the pallet during the lifting movement, the paddle switch arrangement being operatively connected to the lift cylinder arrangement to control operation thereof.

14. The pallet checker system of claim 13, wherein the lift station includes a fifth sensor arrangement attached to the mounting plate arrangement for sensing a position of the paddle switch arrangement and signaling the controller to control the operation of the lift cylinder.

15. The pallet checker system of claim 14, wherein the lift station includes a sixth sensor arrangement mounted on the framework for providing a sensor beam used to detect the obstruction depending from the bottom cross boards during the lifting movement.

16. The pallet checker system of claim 1, wherein a first pallet stop is pivotally mounted on the framework at a rear end of the lift station.

17. The pallet checker system of claim 16, wherein a second pallet stop is pivotally mounted on the framework at a rear end of the transfer station.

18. An apparatus for automatically inspecting, detecting and responding to various structural characteristics of a pallet having a set of top cross boards, a set of bottom cross boards and a set of stringers between the top cross boards and the bottom cross boards, the apparatus comprising:
a framework;
a conveyor arrangement mounted on the framework and operable to convey the pallet to be checked through an in-feed station, and a lift station connected to the in-feed station;
the in-feed station being configured to check the pallet for a presence or an absence of the bottom cross boards as the pallet is carried on the conveyor arrangement;
the lift station being configured to check the pallet for any obstruction depending from the bottom cross boards, and missing material in leading and trailing edges of the top cross boards during a lifting movement of the pallet in the lift station; and
a controller operatively connected to the conveyor arrangement, the in-feed station and the lift station and responsive to signals generated in the in-feed station and the lift station to determine whether the pallet being checked in the in-feed station and the lift station is acceptable or unacceptable,
wherein the lift station includes a sensor arrangement providing a sensor beam arrangement extending across the front and rear ends of the lift station, and
a plurality of paddles pivotally mounted on the front and rear ends of the lift station, the paddles being engaged by the leading and trailing edges of the top cross boards during the lifting movement of the pallet and moved into a position blocking the sensor beam arrangement to indicate the presence of the missing material along at least one of the leading and trailing edges and to signal the controller that the pallet is unacceptable.

19. The apparatus claim 18, wherein the lift station includes a lift arrangement mounted on the framework and having at least one moveable lift plate operably connected with a set of fingers which are engaged and disengaged with bottom surfaces of the pallet by means of an engagement cylinder arrangement connected to the lift plate.

20. The apparatus claim 19, wherein the lift arrangement also includes a lift cylinder arrangement for raising and lowering the lift plate, the engagement cylinder arrangement and the fingers.

21. The apparatus claim 20, wherein the lift station includes a paddle switch arrangement pivotally attached to a mounting plate arrangement and engaged and disengaged by the top cross boards of the pallet during the lifting movement, the paddle switch arrangement being operatively connected to the lift cylinder arrangement to control operation thereof.

22. An automated pallet checker system for checking damage to a pallet having a set of top cross boards, a set of bottom cross boards and set of stringers extending between the top cross boards and the bottom cross boards, the system comprising:
a framework;
a conveyor arrangement mounted on the framework and operable to convey the pallet to be checked through an in-feed station, and a lift station connected to the in-feed station and a transfer station connected to the lift station;
the in-feed station being configured to check the pallet for a presence or an absence of the bottom cross boards as the pallet is carried on the conveyor arrangement;
the lift station being configured to check the pallet for defects in the bottom cross boards and the top cross boards during a lifting movement of the pallet in the lift station; and
a controller operatively connected to the conveyor arrangement, the in-feed station, the lift station and the transfer station and responsive to signals generated in the in-feed station and the lift station to determine whether the pallet being checked in the in-feed station and the lift station is acceptable or unacceptable,
wherein the transfer station is configured to transfer an acceptable pallet from the lift station to a first collection station by means of the conveyor arrangement, and is configured to transfer an unacceptable pallet to a second collection station spaced from the first collection station by means of a first transfer arrangement which transfers the unacceptable pallet laterally of the conveyor arrangement.

23. The pallet checker system of claim 22, wherein the transfer station includes a movable ramp arrangement for selectively raising the pallet from the conveyor arrangement to enable the first transfer arrangement to move the unacceptable pallet towards the second collection station.

24. The pallet checker system of claim 23, wherein the transfer station includes a discharge framework provided with a second transfer arrangement for moving the unacceptable pallet from the discharge framework to the second collection station.

25. A method for checking structural characteristics of a pallet having top members, bottom members and intermediate members between the top members and the bottom members, the method comprising the steps of:
a) providing a conveyor arrangement mounted in a framework and configured to convey the pallet to be checked through an in-feed station and a lift station connected to the in-feed station;
b) providing a controller operatively connected to the conveyor arrangement, the in-feed station and the lift station and configured to respond to signals generated in the in-feed station and the lift station indicative of the condition of the pallet conveyed through the in-feed station and the lift station;

c) checking the pallet for the presence or absence of bottom members as the pallet is conveyed through the in-feed station to the lift station;

d) checking the pallet for obstructions in the bottom members and damage to the top members during a lifting movement of the pallet in the lift station; and e) using the controller to determine whether the pallet being checked in the in-feed station and the lift station is acceptable or unacceptable.

26. The method of claim 25, further including the step of:

f) checking the pallet for obstructions rising from the top members as the pallet is transferred by the conveyor arrangement from the in-feed station to the lift station.

27. The method of claim 26, further including the step of:

g) conveying the pallet from the lift station to a transfer station connected to the lift station such that an acceptable pallet is transferred by the conveyor arrangement to a first collection station, and an unacceptable pallet is transferred by a transfer arrangement mounted on the transfer station to a second collection station.

* * * * *